(12) United States Patent
Ishikawa et al.

(10) Patent No.: US 6,525,923 B2
(45) Date of Patent: Feb. 25, 2003

(54) ELECTRODE FOR AN ELECTRIC DOUBLE LAYER CAPACITOR AND PROCESS FOR PRODUCING IT

(75) Inventors: Takamichi Ishikawa, Kawasaki (JP); Satoru Kuroki, Kawasaki (JP); Manabu Suhara, Yokohama (JP)

(73) Assignee: Asahi Glass Company Ltd., Tokyo (JP)

(*) Notice: Subject to any disclaimer, the term of this patent is extended or adjusted under 35 U.S.C. 154(b) by 0 days.

(21) Appl. No.: 09/987,299

(22) Filed: Nov. 14, 2001

(65) Prior Publication Data

US 2002/0054472 A1 May 9, 2002

Related U.S. Application Data

(62) Division of application No. 09/212,405, filed on Dec. 16, 1998.

(51) Int. Cl.$^7$ ................................................ H01G 9/145
(52) U.S. Cl. ..................... 361/508; 361/509; 361/502; 361/503; 361/518; 429/231.5; 429/249
(58) Field of Search .................................. 361/508, 509, 361/501, 512, 502, 503, 504, 510, 505, 517, 518, 519; 429/231.5, 249; 29/25.03

(56) References Cited

U.S. PATENT DOCUMENTS

| | | | |
|---|---|---|---|
| 3,288,641 A | | 11/1966 | Rightmire |
| 4,194,040 A | | 3/1980 | Breton et al. |
| 4,250,138 A | | 2/1981 | Okita |
| 4,422,992 A | | 12/1983 | Michel |
| 4,500,647 A | | 2/1985 | Solomon |
| 4,737,889 A | | 4/1988 | Nishino et al. |
| 4,820,787 A | | 4/1989 | Kataoka et al. |
| 4,862,328 A | | 8/1989 | Morimoto et al. |
| 5,030,525 A | * | 7/1991 | Hisatomi et al. |
| 5,098,625 A | | 3/1992 | Huang et al. |
| 5,157,586 A | | 10/1992 | Lallemand |
| 5,172,307 A | | 12/1992 | Tabuchi et al. |
| 5,176,958 A | | 1/1993 | Shimizu et al. |
| 5,248,428 A | | 9/1993 | Hagen et al. |
| 5,277,729 A | | 1/1994 | Endo et al. |
| 5,555,155 A | | 9/1996 | Patel et al. |
| 5,682,288 A | | 10/1997 | Wani |
| 5,753,358 A | | 5/1998 | Korleski |
| 5,877,935 A | | 3/1999 | Sato et al. |
| 5,953,204 A | | 9/1999 | Suhara et al. |
| 5,956,225 A | | 9/1999 | Okuyama et al. |
| 6,096,456 A | * | 8/2000 | Takeuchi et al. |
| 6,104,600 A | | 8/2000 | Suhara et al. |
| 6,195,291 B1 | | 2/2001 | Dallabora et al. |
| 6,264,707 B1 | | 7/2001 | Ishikawa et al. |
| 6,335,857 B1 | | 1/2002 | Takimoto et al. |
| 6,349,027 B1 | | 2/2002 | Suhara et al. |
| 6,379,843 B1 | * | 4/2002 | Yamasaki et al. |

FOREIGN PATENT DOCUMENTS

| | | |
|---|---|---|
| DE | 195 48 005 | 7/1996 |
| EP | 0 731 477 | 9/1996 |
| JP | 1-230216 | 9/1989 |
| JP | 4-074405 | 3/1992 |

OTHER PUBLICATIONS

Derwent Abstract, XP–002101653, SU 1 729 773, Apr. 30, 1992.
Patent Abstract of Japan, JP 10–039310, Feb. 13, 1998.
Patent Abtstract of Japan, JP 11–040372, Feb. 12, 1999.

\* cited by examiner

*Primary Examiner*—Dean A. Reichard
*Assistant Examiner*—Nguyen Ha
(74) *Attorney, Agent, or Firm*—Oblon, Spivak, McClelland, Maier & Neustadt, P.C.

(57) ABSTRACT

A process for producing an electrode for an electric double layer capacitor, which includes extruding a mixture including a carbonaceous material, a polytetrafluoroethylene and a processing aid by paste extrusion, and rolling the obtained extruded product by rolling rolls to form it into a sheet shape.

10 Claims, No Drawings

ELECTRODE FOR AN ELECTRIC DOUBLE LAYER CAPACITOR AND PROCESS FOR PRODUCING IT

RELATED APPLICATIONS

This application is a divisional of Ser. No. 09/212,405 filed on Dec. 16, 1998.

BACKGROUND OF THE INVENTION

1. Field of the Invention

The present invention relates to an electrode for an electric double layer capacitor and a process for producing it.

2. Discussion of Background

The demand for electric double layer capacitors utilizing an electric double layer formed at the interface between a polarizable electrode and an electrolyte, particularly coin shaped ones, is rapidly increasing recently, as a memory backup power. On the other hand, the development of an electric double layer capacitor having a large capacitance per volume, small internal resistance, a high energy density and a high output density, is required, for a use wherein a large capacity is required, e.g. as a driving source for electric cars. Further, with regard to an electric double layer capacitor for memory backup, it is desired to reduce the internal resistance.

The electrode for an electric double layer capacitor is prepared, for example, by kneading an activated carbon powder with a solvent of an electrolytic solution such as sulfuric acid, and forming the mixture into a slurry, followed by press forming (U.S. Pat. No. 3,288,641). However, the electrode obtained by the process has a rigid porous structure and thus is likely to be cracked or broken, and it can not be used for a long period of time. On the other hand, a carbon-based electrode has been proposed which is made of a viscous material having a binder such as a polytetrafluoroethylene (hereinafter referred to as PTFE) added to a mixture comprising an activated carbon powder and an electrolytic solution, as the case requires (JP-B-53-7025, JP-B-55-41015). The electrode has crack resistance and break resistance. However, it is inadequate in the shape keeping property, and a cell having a special structure is required to supplement the strength to use the electrode.

In order to obtain an electrode having crack resistance and break resistance, and an excellent shape keeping property, a process has been proposed, which comprises preliminarily molding a kneaded material comprising a carbonaceous material, a binder such as PTFE and a liquid lubricant, followed by stretching or rolling to obtain a formed electrode of sheet shape (JP-A-63-107011, JP-A-2-235320). However, by this process, PTFE is randomly formed into fibers by kneading, and a part of PTFE is formed into fibers and the rest is not, and consequently the hardness of the two parts will be different. Therefore, when forming the sheet electrode into a thin film sheet having, for example, a thickness of at most 0.2 mm, the surface tends to be irregular, and holes are likely to be formed. Therefore, the capacitance per volume (hereinafter referred to as capacitance density) of the electric double layer capacitor can not be made large, and the internal resistance is large.

A process has also been proposed, which comprises mixing an activated carbon powder and PTFE to obtain a paste, coating the paste on a current collector, followed by drying, heating at a temperature higher than the melting point of PTFE, and press-forming the electrode to make it thin to increase the density (JP-A-9-36005). However, with this process, the production steps are complicated, and it is difficult to continuously conduct the process, and a part of PTFE melts so that the internal resistance will be high.

On the other hand, for extrusion of PTFE, a paste extrusion method has been known, which comprises using a polymer (fine powder) obtained by coagulating and drying an aqueous dispersion of PTFE made by emulsion polymerization of a tetrafluoroethylene, adding a processing aid such as naphtha or white lamp oil thereto, preliminarily molding the mixture to form it into a sleeve shape and filling it to a cylinder mold, followed by pressurizing by a ram to extrude it through a nozzle suitable for a shape of a rod or a sheet, and vaporizing the processing aid to obtain a formed product (U.S. Pat. No. 4,177,334, U.S. Pat. No. 4,250,138).

The process is generally applied to molding of PTFE alone or PTFE containing several wt% of a filler, and is not applied to molding wherein a filler is the main component and PTFE is used merely as a mechanical supplement. Namely, since the filler such as graphite, glass fiber or carbon fiber is not likely to undergo plastic deformation, in the case where it is mixed with PTFE and molded, the extrusion pressure tends to be high, and PTFE is highly deformed. Therefore, there is a problem that the obtained extruded product is fragile and has low strength.

SUMMARY OF THE INVENTION

The present invention has been made to overcome the problems of the prior art, and it is an object of the present invention to provide an electrode having a shape of thin film sheet and having high strength and low resistance, and a process for producing it, thereby to provide an electric double layer capacitor having a high capacitance density and small internal resistance, particularly an electric double layer capacitor suitable for use wherein a large current is required with a high capacitance.

The present invention provides a process for producing an electrode for an electric double layer capacitor, which comprises extruding a mixture comprising a carbonaceous material, PTFE and a processing aid by paste extrusion, and rolling the obtained extruded product by rolling rolls to form it into a sheet shape.

Further, the present invention provides an electrode for an electric double layer capacitor, which is a formed product of sheet shape prepared by forming a carbonaceous material by means of PTFE as a binder and which has a thickness of from 0.005 to 0.25 mm, a porosity of from 50 to 80% and the tensile strength in one direction is at least 1.5 kg/cm$^2$.

DETAILED DESCRIPTION OF THE PREFERRED EMBODIMENTS

The electric double layer capacitor using the electrode of the present invention is based on a principle to form an electric double layer at the interface between an electrolytic solution and a carbonaceous material which is a material for an electrode, and to store electric charge in the electric double layer. As the carbonaceous material, a powder of e.g. activated carbon, polyacene or carbon black, which has a specific surface area of from 200 to 3500 m$^2$/g, is preferred. Further, a fiber or a powder of e.g. carbon fiber, carbon whisker or graphite can also be preferably used, so long as its specific surface area is from 200 to 3500 m$^2$/g. As the activated carbon, a phenol type, a rayon type, an acryl type, a pitch type or a coconut shell type may be used. The particle size of the activated carbon is preferably from 0.1 to 100 μm, particularly preferably from 1 to 20 μm, whereby it is easy to form the electrode into a thin film sheet, and the capacitance density can be made high.

It is also preferred to use carbon black in admixture with another carbonaceous material, as a conductive material. In the case of using it as a conductive material, the particle size of the carbon black is preferably from 0.001 to 1 μm, particularly preferably from 0.01 to 0.5 μm, thereby the resistance of the electrode can be made low, even when it is contained in the electrode in a small amount. Further, the specific surface area of the carbon black as a conductive material, is preferably from 200 to 1500 $m^2/g$, particularly preferably from 500 to 1200 $m^2/g$. An electrode comprising the carbon black as a conductive material, activated carbon having a specific surface area of from 200 to 3500 $m^2/g$ and a particle size of from 0.1 to 100 μm, and PTFE, is preferred since the internal resistance can be kept low, and the capacitance can be kept high.

PTFE of the present invention includes not only a homopolymer of tetrafluoroethylene but a copolymer obtained by adding at most 0.5 mol % of another monomer to tetrafluoroethylene, followed by copolymerization. When another monomer is at most 0.5 mol %, the melt fluidity is not given to PTFE, and it is possible to form the copolymer into fibers to prepare an electrode sheet having high strength and low resistance, just like the homopolymner of tetrafluoroethylene. As another monomer, hexafluoropropylene, chlorotrifluoroethylene, perfluoro(alkyl vinyl ether), trifluoroethylene or (perfluoroalkyl)ethylene may, for example, be mentioned.

PTFE is a liquid or a gel when it is of low molecular weight, and in such a state, it can hardly be formed into fibers. Therefore, it is preferred that PTFE contains at least 50 wt % of a polymer having a molecular weight of at least $1 \times 10^6$ as calculated from the standard specific gravity. Further, PTFE obtained by emulsion polymerization is preferred since it is easily formed into fibers.

The processing aid of the present invention is added so that PTFE is suitably formed into fibers and undergoes plastic deformation. It is not particularly limited so long as it is a liquid capable of wetting PTFE easily, and being removed easily from the formed electrode sheet. Specifically, ethanol, methanol, 2-propanol, lamp oil, solvent naphtha, white naphtha, ethylene glycol, propylene glycol, dipropylene glycol or glycerol may, for example, be mentioned. Further, an aqueous dispersion of PTFE may be used as the processing aid, and it may be used alone or in combination with another processing aid.

In the process for producing an electrode of the present invention, PTFE, the carbonaceous material and the processing aid are mixed so that PTFE is contained in the electrode in an amount of preferably from 1 to 50 wt %, particularly preferably from 5 to 30 wt %, to the carbonaceous material. Sine PTFE is contained in the electrode sheet as a binder to keep the shape of the electrode sheet, if PTFE is less than 1 wt %, the strength tends to be low, and if PTFE is more than 50 wt %, the internal resistance of the electrode tends to increase.

In the process for producing an electrode of the present invention, the processing aid may be added after mixing the carbonaceous material and PTFE or when mixing them. The mixture comprising the carbonaceous material, PTFE and the processing aid may be a granulated product, but it does not influence the paste extrusion. It is preferred to add from 20 to 200 wt %, particularly from 30 to 80 wt %, of the processing aid to the carbonaceous material. If the processing aid is less than 20 wt %, the fluidity for extrusion tends to be inadequate, and the extrusion tends to be difficult. If the processing aid is more than 200 wt %, the pressure for extrusion does not increase, PTFE tends to be not adequately formed into fibers, and the processing aid is likely to exude during the extrusion.

The mixture comprising the carbonaceous material, PTFE and the processing aid is preliminarily molded, put into an extrusion device, extruded by paste extrusion and formed into a formed product of rod shape, sheet shape or tube shape. The extrusion drawing ratio in the paste extrusion (a value obtained by dividing a cross-sectional area of the cylinder mold in which a preliminarily formed product is put, by a cross-sectional area of the nozzle for extruding the formed product) is preferably from 5 to 500, more preferably from 10 to 100, particularly preferably from 20 to 60. If it is less than 5, the extruded product tends to be too soft to maintain its shape. If it is more than 500, the extrusion becomes difficult, and the obtained extruded product tends to be fragile.

In the present invention, after paste extrusion it is possible to intermittently and sequentially supply the preliminarily molded product of the mixture to a cylinder mold for extrusion molding, under such a condition that the extruded product remains in the nozzle, to continuously extrude it by extrusion to obtain an elongate extruded product. By rolling the elongate extruded product, an elongate electrode sheet can be obtained.

In the present invention, by rolling by rolling rolls (hereinafter referred to as rolling), the extruded paste product is formed into a sheet shape. The temperature of the rolling rolls is preferably from 20 to 350° C., particularly preferably from 60 to 120° C. If the temperature of the rolling rolls is lower than 20° C., PTFE is not adequately formed into fibers, and the sheet tends to be fragile. If the temperature of the rolling rolls is higher than 350° C., the processing aid will significantly evaporate, and cracking or separation is likely to result on the surface of the sheet.

With regard to the sheet formed by rolling, the processing aid is required to be removed by drying. The processing aid may be removed by drying after the sheet is formed by rolling. A part or whole of the processing aid may be removed by drying during the rolling. The drying temperature is preferably a temperature higher than the boiling point of the processing aid and lower than the melting point of PTFE. Further, it is possible to roll the dried product of sheet shape or the semi-dried product of sheet shape wherein the processing aid is partially removed, by rolling rolls after stretching.

In the case of stretching, the stretching ratio is preferably from 1.1 to 5.0 times, and the stretching is conducted monoaxially or multiaxially. Further, the stretching may be conducted before the drying step. By stretching, the forming of PTFE into fibers is accelerated, and a thin film sheet having high strength and low resistance can be obtained. The temperature during stretching is preferably from 30 to 350° C., particularly preferably from 200 to 320° C., whereby the forming of PTFE into fibers can be more accelerated.

The electrode sheet obtained by the present invention can be finished to be a thin film. The thickness of an electrode sheet of an electric double layer capacitor is preferably thin, for the purpose of increasing the capacitance density. However, if it is too thin, the strength of the electrode sheet will be inadequate and handling becomes difficult, when preparing an electric double layer capacitor element by laminating or rolling up electrode sheets with a separator interposed therebetween. Accordingly, it is preferably from 0.005 to 0.25 mm, particularly preferably from 0.05 to 0.19 mm.

The porosity of an electrode sheet is preferably from 50 to 80%. If it is less than 50%, the capacitance density of the electric double layer capacitor can not be made high, and if it is more than 80%, the internal resistance will increase. The porosity is calculated from the formula of (1−apparent density/true density)×100 (%).

The electrode sheet obtained by the present invention can be used as an electrode as it is initially formed. However, it may be used after baking, as the case requires. The baking may be complete baking at a temperature higher than the melting point of PTFE or incomplete baking at a temperature lower than the melting point of PTFE.

By the process of the present invention, an extruded product having an excellent shape keeping property can be obtained, wherein PTFE is formed into fibers in the extrusion direction to have a network structure by paste extrusion, and the carbonaceous material is kept by the network structure of PTFE. With regard to the strength of the electrode sheet, the tensile strength in one direction is preferably at least 1.5 kg/cm$^2$, particularly preferably at least 2.0 kg/cm$^2$. Generally, the direction is the paste extrusion direction. In the present specification, the tensile strength of an electrode is a value obtained by dividing the maximum load, when the electrode sheet is dried for one hour at a temperature of 250° C., punched to a shape of a dumbbell specimen of No. 1 as stipulated in JIS K6301, and subjected to a tensile test at a pulling rate of 200 mm/min at an atmosphere temperature of 25±2° C., by the cross-sectional area (the thickness of the electrode sheet×the width of the parallel parts).

Further, in the paste extrusion, the cross-sectional area in the direction vertical to the extrusion direction of the extruded product, is made gradually narrow from the cylinder mold so that pressure is exerted to the desired nozzle for deformation. Therefore, holes seen in the kneaded product are less likely to remain. By rolling the extruded product, the forming of PTFE into fibers is further accelerated. Accordingly, even when the amount of PTFE is small, the electrode sheet formed into a thin film, is excellent in crack resistance, break resistance and shape keeping property, and has high strength.

Further, since PTFE is formed into fibers, and has a three-dimensional network structure, the increase of the resistance of the electrode by blending PTFE is small. Further, by stretching the product of sheet shape, the forming of PTFE into fibers is accelerated and the three-dimensional network structure spreads, and the resistance of the electrode will further decrease. Further, in the case where carbon black is added as a conductive material, a high pressure is exerted on carbon black in both steps of paste extrusion and rolling, whereby the electrode will have low resistance by electrical connection even with a small amount of carbon black.

EXAMPLES

Example 1

Now, the present invention will be described in further detail with reference to Examples. However, it should be understood that the present invention is by no means restricted to such specific Examples.

To a mixture comprising 80 wt % of a phenol type high purity activated carbon powder having a specific surface area of 1500 m$^2$/g and an average particle size of 10 μm, 10 wt % of carbon black having a specific surface area of 1270 m$^2$/g and an average particle size of 0.03 μm, and 10 wt % of PTFE powder, ethanol was added in an amount of 60 wt % based on the carbonaceous material (activated carbon and carbon black), followed by mixing. The mixture was preliminarily molded to a rectangular parallelopiped shape, and paste extrusion was conducted by using a nozzle having an extrusion drawing ratio of 40 and a rectangular cross section. The obtained extruded product was rolled by rolling rolls at a temperature of 80° C., followed by drying at a temperature of 250° C. for 30 minutes. Ethanol was removed and a sheet having a thickness of 120 μm and a porosity of 66% was obtained.

The sheet was dried at a temperature of 250° C. for one hour, punched into a shape of a dumbbell specimen of No. 1 form as stipulated in JIS K6301, and subjected to a tensile test at a pulling rate of 200 mm/min at an atmospheric temperature of 25° C. to measure the maximum load. The measurement was repeated three times, and the average value was taken as the maximum load applied to the sheet. In order to measure the tensile strength of the sheet in paste extrusion direction, the dumbbell specimen was punched so that the longitudinal direction was the paste extrusion direction. The tensile strength of the sheet calculated from the value of the maximum load was 3.5 kg/cm$^2$.

To one side of a pure aluminium foil of a rectangular shape having a width of 4 cm and a height of 6 cm, and a thickness of 50 μm, and having a lead terminal, an electrode sheet obtained by punching the above sheet into an area of 4 cm×6 cm, was bonded by means of a conductive adhesive, followed by heat curing of the adhesive to obtain an electrode assembly. Two sheets of such electrode assemblies were prepared, and the electrode sides of the electrode assemblies were faced each other. A glass fiber separator having a thickness of 40 μm was interposed between the electrode assemblies, which were then sandwiched between two glass plates having a thickens of 2 mm, a width of 5 cm, and a height of 7 cm, to obtain an element. The total thickness of the two electrode assemblies and the separator was 0.39 mm.

As an electrolytic solution, a solution having 1.5 mole/l of triethylmonomethylammonium tetrafluoroborate dissolved in propylene carbonate, was used. The element was subjected to vacuum heating for 3 hours at a temperature of 200° C., to remove impurities from the element, and then it was impregnated with the electrolytic solution under vacuum and then accommodated in a polypropylene rectangular bottomed cylindrical container, to obtain an electric double layer capacitor. The direct current resistance and the capacitance were measured at a current density of 20 mA/cm$^2$, and the capacitance per volume (capacitance density) and the resistance per volume were calculated. The results are shown in Table 1.

Example 2

A sheet was prepared in the same manner as in Example 1, except that the thickness was made to be 80 μm and the porosity was made to be 64% by rolling. The tensile strength of the sheet in the paste extrusion direction was measured in the same manner as in Example 1, and found to be 2.0 kg/cm$^2$. An electric double layer capacitor was prepared in the same manner as in Example 1, except that an electrode sheet obtained from the sheet was used, and the same evaluation as in Example 1 was conducted. The results are shown in Table 1.

Example 3

A sheet was prepared in the same manner as in Example 1, except that the thickness was made to be 150 μm and the porosity was made to be 69% by rolling. The tensile strength of the sheet in the paste extrusion direction was measured in the same manner as in Example 1, and found to be 3.1 kg/cm$^2$. An electric double layer capacitor was prepared in the same manner as in Example 1, except that an electrode sheet obtained from the sheet was used, and the same evaluation as in Example 1 was conducted. The results are shown in Table 1.

Example 4

A sheet was prepared in the same manner as in Example 1, except that a sheet having a thickness of 150 μm was obtained by rolling, then the processing agent was dried, and then stretching was conducted under a stretching ratio of 1.5 times at a temperature of 300° C. to make the thickness to be 110 μm and the porosity to be 69%. The tensile strength of the sheet in the paste extrusion direction was measured in the same manner as in Example 1 and found to be 2.8 kg/cm$^2$. An electric double layer capacitor was prepared in the same manner as in Example 1, except that an electrode sheet obtained from the sheet was used, and the same evaluation as in Example 1 was conducted. The results are shown in Table 1.

Example 5 (Comparative Example)

A sheet was prepared in the same manner as in Example 1, except that press forming by a press was carried out without conducting paste extrusion, rolling was repeated 5 times to make the thickness to be 250 μm and the porosity to be 86%. The tensile strength of the sheet in the stretching direction was measured in the same manner as in Example 1, and found to be 1.3 kg/cm$^2$. An electric double layer capacitor was prepared in the same manner as in Example 1, except that an electrode sheet obtained from the sheet was used, and the same evaluation as in Example 1 was conducted. The results are shown in Table 1.

Example 6 (Comparative Example)

A sheet having a thickness of 150 μm was obtained in the same manner as in Example 1, except that press forming by a press was carried out without conducting paste extrusion, and rolling was repeated 10 times. However, many holes were formed in the sheet, and the sheet could not be used as an electrode.

TABLE 1

|  | Porosity (%) | Internal resistance (Ω) | Capacitance (F) | Volume (cm$^3$) | Capacitance density (F/cm$^3$) | Resistance per volume (Ω/cm$^3$) |
|---|---|---|---|---|---|---|
| Example 1 | 70 | 0.25 | 10.3 | 0.94 | 11.0 | 0.27 |
| Example 2 | 64 | 0.26 | 8.2 | 1.06 | 9.7 | 0.30 |
| Example 3 | 69 | 0.32 | 11.9 | 1.08 | 11.0 | 0.30 |
| Example 4 | 69 | 0.24 | 10.1 | 0.94 | 10.7 | 0.26 |
| Example 5 | 86 | 0.95 | 15.1 | 1.56 | 9.7 | 0.61 |

EFFECTS OF THE INVENTION

The electrode obtained by the process of the present invention has high strength, since PTFE is formed into fibers to have a three-dimensional network structure. It also has an excellent crack resistance, break resistance and shape keeping property, and low resistance, as an electrode of thin film sheet shape. Particularly, when carbon black is contained as a conductive material, the electrode becomes to have low resistance by electrical connection, even if the amount of carbon black is small, since high pressure is put on carbon black.

Therefore, the electric double layer capacitor comprising the electrode of the present invention has small internal resistance and large capacitance per volume.

What is claimed is:

1. An electrode for an electric double layer capacitor, which is a formed product of sheet shape prepared by forming a carbonaceous material by means of a polytetrafluoroethylene as a binder and which has a thickness of from 0.005 to 0.25 mm, a porosity of from 50 to 80% and the tensile strength in one direction is at least 1.5 kg/cm$^2$.

2. The electrode for an electric double layer capacitor according to claim 1, which is prepared by extruding a mixture comprising the carbonaceous material, the polytetrafluoroethylene and a processing aid by paste extrusion, and rolling the obtained extruded product by rolling rolls to form it into a sheet shape.

3. The electrode for an electric double layer capacitor according to claim 2, wherein the tensile strength in the paste extrusion direction is at least 1.5 kg/cm$^2$.

4. The electrode for an electric double layer capacitor according to claim 1, wherein the polytetrafluoroethylene is formed into fibers to have a three-dimensional network structure.

5. The electrode for an electric double layer capacitor according to claim 1, wherein from 1 to 50 wt % of the polytetrafluoroethylene is contained, based on the carbonaceous material.

6. The electrode for an electric double layer capacitor according to claim 1, wherein the carbonaceous material comprises an activated carbon having a specific surface area of from 200 to 3,500 m$^2$/g and a particle size of from 0.1 to 100 μm and a carbon black having a specific surface area of from 200 to 1,500 m$^2$/g and a particle size of from 0.001 to 1 μm.

7. An electric double layer capacitor, which comprises an electrode made of a formed product of sheet shape prepared by forming a carbonaceous material by means of a polytetrafluoroethylene as a binder and which has a thickness of from 0.005 to 0.25 mm, a porosity of from 50 to 80% and the tensile strength in one direction is at least 1.5 kg/cm$^2$.

8. The electric double layer capacitor according to claim 7, wherein the formed product of sheet shape is prepared by extruding a mixture comprising a carbonaceous material, a polytetrafluoroethylene and a processing aid by paste extrusion, and rolling the obtained extruded product by rolling rolls to form it into a sheet shape.

9. The electric double layer capacitor according to claim 8, wherein the formed product of sheet shape has a tensile strength in the paste extrusion direction of at least 1.5 kg/cm$^2$.

10. An electric double layer capacitor, which comprises an electrode which is prepared by preliminarily molding a mixture comprising a carbonaceous material, a polytetrafluoroethylene and a processing aid, then intermittently and sequentially supplying it to a cylinder mold for extrusion molding to continuously extrude it by pate extrusion to obtain an elongate extruded product, and rolling the obtained extruded product by rolling rolls to form it into a sheet shape.

* * * * *

UNITED STATES PATENT AND TRADEMARK OFFICE
CERTIFICATE OF CORRECTION

PATENT NO.     : 6,525,923 B2
DATED          : February 25, 2003
INVENTOR(S)    : Ishikawa et al.

It is certified that error appears in the above-identified patent and that said Letters Patent is hereby corrected as shown below:

<u>Title page,</u>
Item [30], the Foreign Application Priority Data has been omitted. Item [30], should read as follows:

-- [30]  Foreign Application Priority Data
  Dec. 24, 1997  (JP) ........................ 9-355589 --

Signed and Sealed this

Seventeenth Day of June, 2003

JAMES E. ROGAN
*Director of the United States Patent and Trademark Office*